United States Patent
Spindelbalker

(10) Patent No.: US 6,464,353 B1
(45) Date of Patent: Oct. 15, 2002

(54) INCLINATION HINGE FOR THE BOW OF A PAIR OF EYEGLASSES

(75) Inventor: Rupert Spindelbalker, Puchenau (AT)

(73) Assignee: Silhouette International Schmied AG, Linz (AT)

(*) Notice: Subject to any disclaimer, the term of this patent is extended or adjusted under 35 U.S.C. 154(b) by 0 days.

(21) Appl. No.: 09/807,197
(22) PCT Filed: Sep. 16, 1999
(86) PCT No.: PCT/AT99/00227
§ 371 (c)(1), (2), (4) Date: Apr. 10, 2001
(87) PCT Pub. No.: WO00/22476
PCT Pub. Date: Apr. 20, 2000

(30) Foreign Application Priority Data

Oct. 12, 1998 (AT) .................................... 1695/98

(51) Int. Cl.⁷ ................................................. G02C 5/14
(52) U.S. Cl. ........................................ 351/120; 351/111
(58) Field of Search ....................... 351/120, 111, 351/118, 119, 115

(56) References Cited

U.S. PATENT DOCUMENTS

| 5,457,503 A | 10/1995 | Chen | 351/105 |
| 5,565,937 A | 10/1996 | Lee | 351/120 |
| 5,812,234 A | 9/1998 | Carswell | 351/120 |
| 6,086,200 A * | 7/2000 | Wang-Lee | 351/120 |

FOREIGN PATENT DOCUMENTS

| FR | 1 552 667 | 1/1969 |
| FR | 2 599 155 | 5/1986 |
| FR | 2 714 492 | 12/1993 |
| WO | 98/02770 | 1/1998 |

* cited by examiner

Primary Examiner—Hung Xuan Dang
(74) Attorney, Agent, or Firm—Collard & Roe, P.C.

(57) ABSTRACT

An inclination joint for a spectacle side (3) is described, comprising a joint bar (7) which is guided between the side walls (9) of a receiving pocket (8) of a spectacle side cheek (5) and which is swivelably held in an inclination axle (10) penetrating the receiving pocket (8) and can be latched in various inclination positions by means of a snap-in toothing (12) made of the joint bar (7) on the one hand and rows of teeth (13, 14) associated with the spectacle side cheek (5) on the other hand. In order to ensure favorable constructional conditions it is proposed that on at least one of the side walls (9) of the receiving pocket (8) and the adjacent side surface of the joint bar (7) there is provided a row of teeth (13, 14) of each of the snap-in toothing (12) whose teeth are aligned in the direction of introduction (15) of the joint bar (7) into the receiving pocket (8).

2 Claims, 1 Drawing Sheet

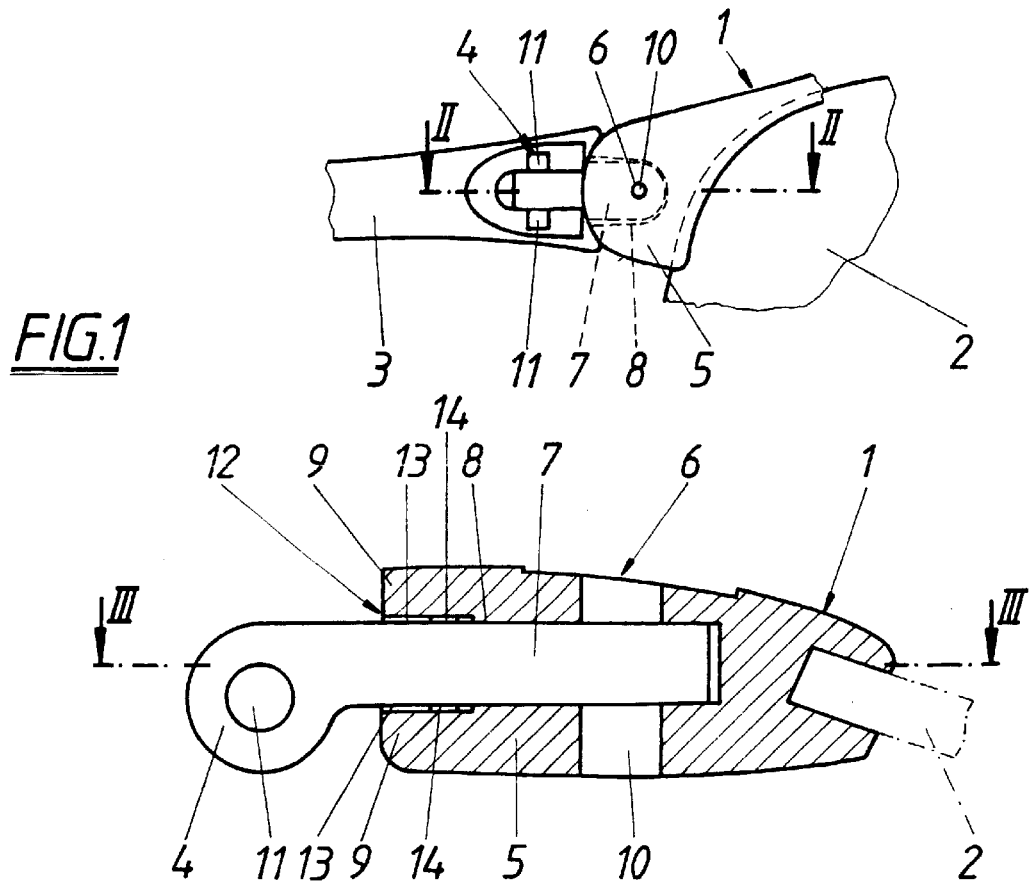
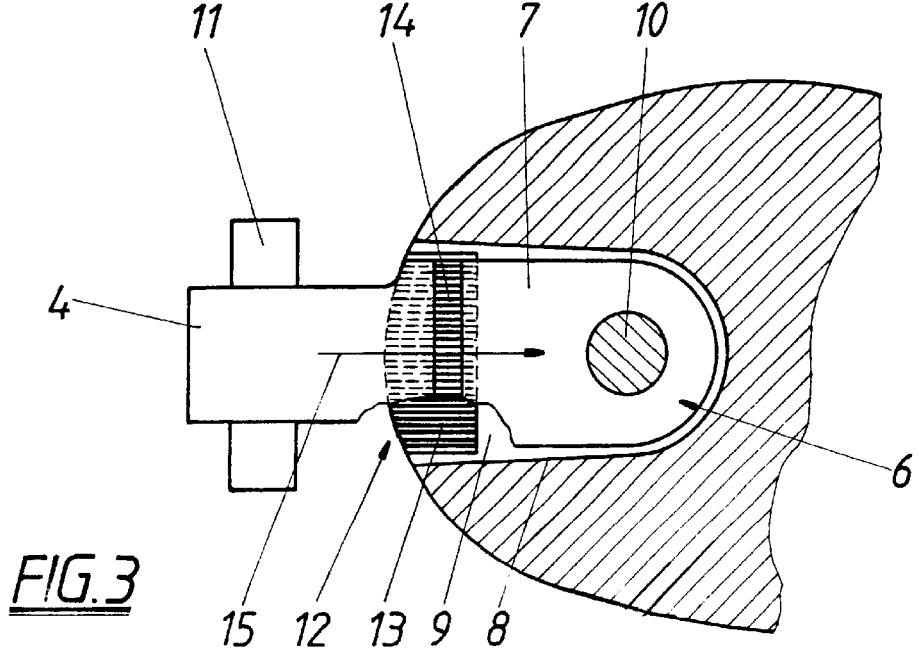

INCLINATION HINGE FOR THE BOW OF A PAIR OF EYEGLASSES

CROSS REFERENCE TO RELATED APPLICATIONS

Applicant claims priority under 35 U.S.C. §119 of AUSTRIAN Application No. A 1695/98 filed on Oct. 12, 1998. Applicant also claims priority under 35 U.S.C. §120 of PCT/AT99/00227, filed on Sep. 16, 1999. The international application under PCT article 21(2) was not published in English.

BACKGROUND OF THE INVENTION

The invention relates to an inclination joint for a spectacle side with a joint bar which is guided between the side walls of a receiving pocket of a side cheek and which is swivelably held in an inclination axle penetrating the receiving pocket and can be latched in various inclination positions by means of a snap-in toothing made of the joint bar on the one hand and rows of teeth associated with the side cheek on the other hand.

STATE OF THE ART

The purpose of the angular adjustment of a spectacle side it is known (WO 98/02770 A1) to provide a receiving pocket for a joint bar on the side cheeks on which the spectacle side is articulated by means of a conventional side joint. Said joint bar is held swivelably between the two side walls of the receiving pocket by an inclination axle penetrating the side walls and the joint bar, which joint bar extends in the stretched position of the side transversally to the same and transversally to the rotational axis of the side joint, so that the side can be set in its inclination with respect to the spectacle frame. The set inclination position of the side is secured by a snap-in toothing which consists of toothed ring sections, which are coaxial to the inclination axle, on the side walls of the receiving pockets and inner toothed ring sections which cooperate with the same which are arranged on the shoulders of the joint bar which overlap the toothed face sides of the side walls of the receiving pocket. Since the inclination adjustment of the sides merely demands small angular steps for the adjustment to the anatomical particularities of an eyeglass wearer, it is necessary to provide the snap-in teeth of the snap-in toothing with a small arrangement, which despite facilitating the skipping of teeth of the snap-in toothing during an inclination adjustment also makes a sturdy snap-in connection more difficult, because bearing plays and production tolerances have a direct influence due to snap-in toothing which is coaxial to the inclination axle.

SUMMARY OF THE INVENTION

The invention is thus based on the object of arranging an inclination joint of the kind mentioned above in such a way that even under the conditions of series production, a secure latching seat of the side in the respectively chosen inclinatory position can be ensured.

The invention achieves the object in such a way that on at least one of the side walls of the receiving pocket and the adjacent side surface of the joint bar there is provided a row of teeth each of the snap-in toothing whose teeth are aligned in the direction of introduction of the joint bar into the receiving pocket.

Since as a result of said measures the snap-in toothing is not performed along a cylinder coaxial to the inclination axle, but in a plane perpendicular to the inclination axle, tolerance ranges concerning the radial dimensions of the inclination joint do not play any role in the security of the latching seat of the joint bar in the receiving pocket as provided for by the snap-in toothing. The alignment of the teeth of the snap-in toothing in the direction of introduction of the joint bar into the receiving pocket allows a simple assembly of the inclination joint because the joint bar can be introduced into the receiving pocket parallel to the tooth alignment in order to be tightly held in the receiving pocket by the subsequently inserted inclination axle. The inclination position of the joint bar which corresponds to the direction of introduction of the joint bar into the receiving pocket, which preferably is the middle position, is adequately secured by means of the parallel teeth of the mutually engaging rows of teeth of the snap-in toothing, namely under a substantial tolerance compensation because with a growing distance of the teeth from the tooth lying in an axial plane of the inclination axle the angle of the tooth alignment increases towards an associated radius concerning the inclination axle. If the joint bar is turned from said inclination position, the teeth of the row of teeth on the joint bar side will turn with respect to the teeth of the receiving pocket, which leads to a further tolerance compensation because the teeth of the mutually engaging rows of teeth of the snap-in toothing engage under an elastic pretension. The turning of the teeth according to the angular steps as given by the division of the teeth is restricted to a few angular steps, which does not play any role in the inclination adjustment of a spectacle side because the inclination adjustment can be limited to a small angular range. It is thus seen that the measures in accordance with the invention lead to an inclination joint which allows a latching seat which is free from play for the set inclination positions. The arrangement of the rows of teeth between the side surfaces of the joint bar and the adjacent side walls of the receiving pocket also offers advantageous prerequisites for the elastic skipping of the teeth of the snap-in toothing during the latching adjustment because the side walls of the receiving pocket can rebound accordingly.

In order to allow achieving particularly simple constructional conditions the snap-in toothing can comprise a row of teeth extending in a straight line on at least one side surface of the joint bar and an associated row of teeth with a larger width in the orifice zone of the receiving pocket. The larger width of the row of teeth associated with the receiving pocket is necessary in a straight row of teeth of the joint bar in order to take the mutual offset of the mutually engaging rows of teeth into account during a swiveling adjustment of the joint bar. In this connection it is also necessary to consider that the width of the tooth row of the joint bar must remain limited so as to also ensure a tooth engagement of the snap-in toothing also after a swiveling of the joint bar.

BRIEF DESCRIPTION OF THE DRAWINGS

The subject matter of the invention is shown by way of an example in the drawings, wherein:

FIG. 1 shows a spectacle with an inclination joint in accordance with the invention for a spectacle side in a sectional view in the zone of the inclination joint, showing a side view of the inner side of the spectacle side;

FIG. 2 shows a sectional view along line II—II of FIG. 1 on a larger scale, and

FIG. 3 shows a sectional view along line III—III of FIG. 2.

DETAILED DESCRIPTION OF THE PREFERRED EMBODIMENTS

The spectacle shown in FIG. 1 is provided with a frame 1 for receiving spectacle glasses 2 and two spectacle sides 3 which are articulated on a spectacle side cheek 5 of frame 1 via a side joint 4. The side joint 4 is not rigid, however, but is connected with the spectacle side cheek 5 by way of an inclination joint 6 which consists of a joint bar 7 which engages in a receiving pocket 8 of the spectacle side cheek 5. The joint bar 7 which is guided between the side walls 9 of the receiving pocket 8 is held swivelably in the receiving pocket 8 by means of an inclination axle 10 which penetrates the side walls 9 and the joint bar 7, so that spectacle side 3 which is articulated on the joint bar 7 of the inclination joint 6 can be adjusted, in its stretched position as shown in FIG. 1, in its inclination transversally to its longitudinal direction and transversally to the joint axle 11.

In order to secure the respective inclination position a snap-in toothing 12 is provided which consists of rows of teeth 13 and 14 which cooperate in pairs and which are provided, on the one hand, in the orifice zone of the receiving pocket 8 on the inner side of the side walls 9 of the receiving pocket 8 and, on the other hand, on the adjacent side surfaces of the joint bar 7. As is shown in particular in FIG. 3, the teeth of the rows of teeth 13 and 14 are not aligned radially towards the inclination axle 10, but parallel to one another, with the tooth alignment corresponding to the direction of introduction (as indicated by arrow 15) of the joint bar 7 into the receiving pocket 8. As a result of this measure it is possible to easily insert the joint bar 7 during the mounting of the inclination joint 6 into the receiving pocket 8 under simultaneous latching engagement of the snap-in toothing 12 in order to be held in a rotationally adjustable manner by way of the inclination axle 10 in the receiving pocket 8. From said middle position which is given by the direction of introduction 15, the joint bar 7 can be swiveled up or down by one or two teeth, with the rows of teeth 14 of the joint bar 7 being rotated by the inclination step towards the rows of teeth 13. This means that the teeth must engage under a low inclined position, which is only possible with an elastic pretension of the tooth engagement. This elastic pretension leads to a fixing of the joint bar 7 which is free from play within the receiving pocket 8 with a sufficient latching seat so as to avoid any undesirable inclination adjustment of the side 3. As is shown in FIG. 3, the rows of teeth 14 of the joint bar 7 extend straight and perpendicular to the direction of introduction 15, with the width of the teeth being chosen smaller than the width of the teeth of the rows of teeth 13 in order to take into account the mutual displacement of the cooperating rows of teeth 13 and 14 in the direction of the tooth width during the setting of the inclination.

What is claimed is:

1. An inclination joint for pivotally holding a spectacle sidepiece on an inclination axle in a side cheek of a spectacle frame, wherein the sidepiece comprises a joint bar, the side cheek defines a receiving pocket having side walls wherebetween the joint bar is introduced into the receiving pocket and guided between the side walls, the inclination axle passing through the receiving pocket, and a snap-in toothing for latching the spectacle sidepiece in various inclination positions, the snap-in toothing comprising a first row of teeth in at least one of the side walls of the receiving pocket and a second row of teeth in an adjacent surface of the joint bar and meshing with the first row of teeth, the teeth being in alignment. with the direction of introduction of the joint bar into the receiving pocket.

2. An inclination joint for pivotally holding a spectacle sidepiece on an inclination axle in a side cheek of a spectacle frame, wherein the sidepiece comprises a joint bar, the side cheek defines a receiving pocket having side walls wherebetween the joint bar is introduced into the receiving pocket and guided between the side walls, the inclination axle passing through the receiving pocket, and a snap-in toothing for latching the spectacle sidepiece in various inclination positions, the snap-in toothing comprising a first row of teeth in at least one of the side walls of the receiving pocket and a second row of teeth in an adjacent surface of the joint bar and meshing with the first row of teeth, the teeth being in alignment with the direction of introduction of the joint bar into the receiving pocket, wherein the second row of teeth extending in a straight line transverse to the direction of introduction, and the teeth of the first row being wider than the teeth of the second row, the first row of teeth extending in an end zone of the receiving pocket through which the joint bar is introduced.

* * * * *